United States Patent [19]

Ushikubo et al.

[11] Patent Number: 4,824,501

[45] Date of Patent: Apr. 25, 1989

[54] METHOD OF MANUFACTURING RADIAL TIRE

[75] Inventors: Hisao Ushikubo; Toru Tsuda, both of Tokyo; Ichiro Takahashi, Saitama, all of Japan

[73] Assignee: Bridgestone Corporation, Tokyo, Japan

[21] Appl. No.: 58,441

[22] Filed: Jun. 5, 1987

[30] Foreign Application Priority Data

Jun. 11, 1986 [JP] Japan .................................. 61-133771

[51] Int. Cl.$^4$ ........................ B29D 30/10; B29D 30/20
[52] U.S. Cl. ...................................... 156/130; 156/124
[58] Field of Search ............... 156/123, 117, 126, 124, 156/128.1, 130, 133; 152/531, 533, 535, 538

[56] References Cited

U.S. PATENT DOCUMENTS

| 3,503,432 | 3/1970 | Maiocchi | 152/531 X |
| 3,786,851 | 1/1974 | Mirtain et al. | 152/531 X |
| 3,831,656 | 8/1974 | Senger et al. | 152/531 X |
| 3,850,219 | 11/1974 | Snyder | 156/130 X |
| 3,999,585 | 12/1976 | Grawey | 152/531 |
| 4,146,415 | 3/1979 | Caretta et al. | 156/130 |
| 4,183,389 | 1/1980 | Grosch | 152/531 X |
| 4,202,394 | 5/1980 | Vän der Burg | 152/531 |
| 4,528,052 | 7/1985 | Yoshie et al. | 156/117 |

FOREIGN PATENT DOCUMENTS

| 56-71604 | 6/1981 | Japan | 152/531 |
| 1487426 | 9/1977 | United Kingdom . | |

Primary Examiner—David Simmons
Assistant Examiner—Ramon R. Hoch
Attorney, Agent, or Firm—Sughrue, Mion, Zinn, Macpeak & Seas

[57] ABSTRACT

To obtain a uniform initial cord tension in an auxiliary layer of a radial tire made up of a toroidal carcass, a belt, the auxiliary layer and a tread rubber, the belt is formed by winding inextensible cords around a drum with a radius of curvature substantially the same as that of a tire tread. Further, when the belt is formed by winding the cords around a flat drum, the auxiliary layer is formed on the belt by winding a heat-shrinkable cord around the belt in spiral fashion in such a way as to apply a higher tension at both the ends of the belt layer than at the center thereof. The radial tire thus manufacture is excellent in high-speed tire durability and tire uniformity, without causing belt separation trouble at high speed.

10 Claims, 3 Drawing Sheets

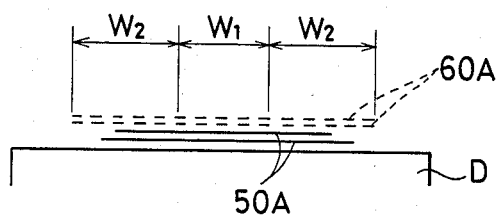
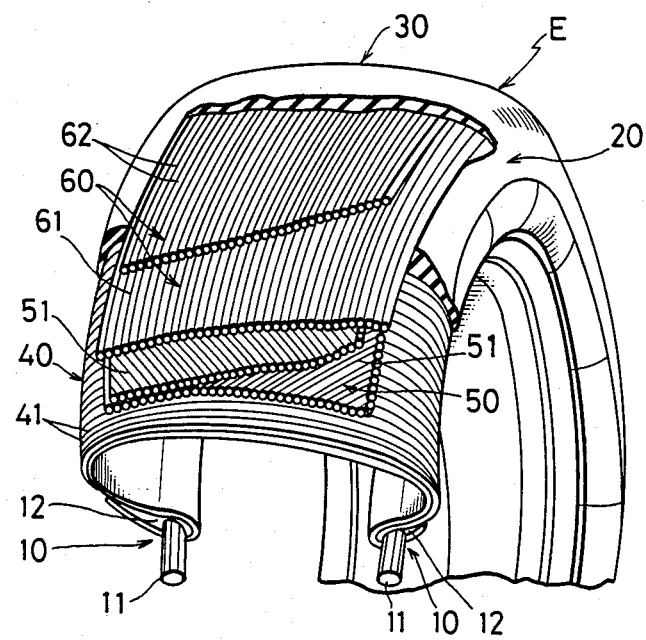
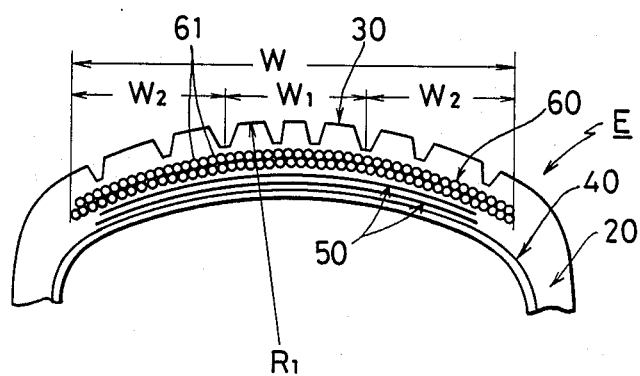

METHOD OF MANUFACTURING RADIAL TIRE

BACKGROUND OF THE INVENTION

1. Field of the Invention

The present invention relates to a method of manufacturing a radial tire, and more specifically to a method of manufacturing a so-called low section radial tire available for high performance passenger cars and formed with an improved auxiliary layer arranged on the outermost belt layer.

2. Description of the Prior Art

In low section radial tires for high performance passenger cars, a plurality of belt layers are formed at the crown portion of a carcass in such a way that cords of each belt layer are inclined at a small angle with respect to the tire equatorial plane and cords of different belt layers are laid one upon another so as to intersect each other. Further an auxiliary layer made of heat shrinkable cord is wound around the outermost belt layer along the tire circumferential direction, viz. in parallel to the tire equatorial plane, in order to improve the hoop-effect of the belt layers.

In forming the above-mentioned low section radial tire, two belt layers 50 are wound around a flat drum D (shown in FIG. 1); an auxiliary layer 60 is wound around the outermost belt layer 50 so as to cover the entire width of the belt layer; and a tread rubber 30 is bonded onto the auxiliary layer to form a belt structure body B. On the other hand, a carcass structure body is formed in a carcass forming process different from the above belt forming process. The formed carcass structure body 40 is expanded into a toroidal shape (not shown); and the already-formed belt structure body B is fitted to the outer peripheral surface of the carcass structure body 40 so as to uniformly cover the carcass, in order to form a green tire (not shown). Thereafter, the formed green tire is vulcanized or hardened within a mold (not shown) into a finished tire.

In the prior-art method of manufacturing the radial tire, there exists a problem such that the coiling diameter of cords 61 of the auxiliary layer 60 of the finished tire become smaller at both the side areas $W_2$ (shown in FIG. 2) of the tread 30 than at the central area $W_1$ of the tread 30, so that the initial cord tension or initial cord elastic modulus is smaller at the side areas $W_2$ than at the central area $W_1$.

This problem gives rise to a decrease in hoop effect at the side areas $W_2$ as compared with that at the central area $W_1$, so that the two belt layers 50 deform radially outward due to centrifugal force generated when the tire is rotating at high speeds. Therefore the belt layers are excessively fatigued, resulting in belt end separation trouble, poor high-speed tire durability, and tire non-uniformity.

Originally, the auxiliary layer 60 is additionally arranged to reduce tire radially-outward deformation at high speed. However, since the initial cord tension is smaller at both the sides of the tread, the arrangement of the auxiliary layer is not effective.

SUMMARY OF THE INVENTION

With these problems in mind, therefore, it is the primary object of the present invention to provide a method of manufacturing a radial tire which can prevent both belt ends from being deformed or expanded radially outwardly due to centrifugal force generated when the tire is rotating at high speed, thus evading belt separation trouble, improving high-speed tire durability and tire uniformity.

To achieve the above-mentioned object, a method of manufacturing a radial tire having a toroidal carcass, a belt arranged on the crown of the carcass, an auxiliary layer arranged on the belt, and a tread rubber arranged on the auxiliary layer, according to the present invention comprises the following steps of: (a) forming the belt by wrapping at least two rubberized layers made of inextensible cords around a drum with a radius of curvature substantially the same as that of a tire tread in such a way that cords of each layer are inclined at a small angle with respect to a drum circumferential direction and cords of two different belt layers are laid one upon another so as to intersect each other; (b) forming the auxiliary layer on the belt by winding a ribbon having a plurality of heat-shrinkable cords around an outermost belt layer in spiral fashion along the drum circumferential direction; (c) bonding the tread rubber layer onto the formed auxiliary layer to form a belt structure body; (d) forming the carcass structure body independently from the belt structure body and expanding the formed carcass structure body into the toroidal shape; (e) fitting the formed belt structure body to an outer periphery of the formed toroidal carcass structure body to form a green tire; and (f) vulcanizing the formed green tire within a vulcanization mold to obtain a finished tire.

Further, where the belt is formed by wrapping at least two rubberized layers made of inextensible cords around a flat drum as in the prior-art method, the auxiliary layer is formed on the belt by winding a heat-shrinkable cord around an outermost belt layer in spiral fashion along a drum circumferential direction in such a way as to apply a higher tension at both ends of the belt layer than at the center thereof.

The gist of the present invention results from the reason why the initial cord tension or the initial cord elastic modulus is smaller at both the side areas $W_2$ of the cords 61 of the auxiliary layer 60 than at the central area $W_1$ thereof. That is, as described already under Description of the Prior Art, the belt structure body B including the auxiliary layer 60 is formed into a band-shaped body by use of the flat drum D as shown in FIG. 1. Therefore, although being flat over the entire width of the drum D shown in FIG. 1, the auxiliary layer 60 is deformed or expanded radially outwardly along the crown portion of the carcass structure body when fitted to the carcass, so that a large tension is applied to the central area $W_1$ of the auxiliary layer 60 as compared with both the side areas $W_2$ thereof.

In addition, when the green tire is vulcanized within a mold, since the radius of the curvature of the vulcanizing mold is smaller than that of the tread of the belt layers 50 fitted to the flat drum D (i.e. the mold is outwardly convex in shape), a large tension is applied to the auxiliary layer 60 at the central area $W_1$.

In other words, the initial cord tension or the initial cord modulus is high at the central area $W_1$ and low at both the side areas $W_2$.

On the basis of the above reason, the radius of the curvature of the drum for forming the auxiliary layer 60 is determined to be the same as that of the tread of the finished tire, in forming the auxiliary layer 60 into a band shape. In this method, it is possible to distribute the initial cord tension or the initial cord modulus uniformly over the entire width of the auxiliary layer of the finished tire.

Since the tension of the cords of the auxiliary layer is uniform over the transversal direction of the belt, it is possible to prevent the belt from being expanded partially (in particular at both the ends of the tread) due to a centrifugal force generated when the tire is rotating at high speed, thus preventing belt separation trouble and improving tire high-speed durability and uniformity.

BRIEF DESCRIPTION OF THE DRAWINGS

The features and advantages of the method of manufacturing a radial tire according to the present invention will be more clearly appreciated from the following description taken in conjunction with the accompanying drawings in which like reference numerals designate the same or similar elements or sections throughout the figures thereof and in which:

FIG. 4 is a diagrammatic cross-sectional view for assistance in explaining the second embodiment of the method of the present invention;

FIG. 5 is a perspective cut-away view showing the radial tire manufactured in accordance with the method of the present invention; and FIG. 6 is a diagrammatic cross-sectional view showing the essential portions of a radial tire manufactured by the method of the present invention, taken along a radial plane of the tire.

DETAILED DESCRIPTION OF THE PREFERRED EMBODIMENTS

The method of manufacturing a low section radial tire according to the present invention will be described hereinbelow with reference to the attached drawings.

Figure 1:
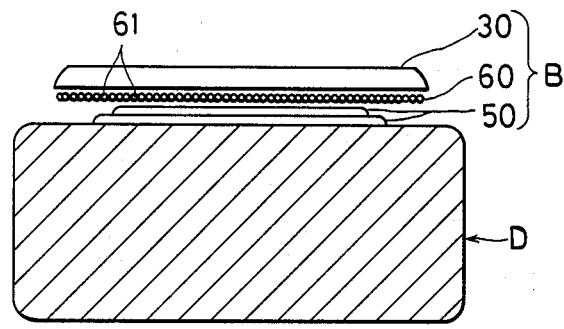
FIG. 1 is a diagrammatic cross-sectional view for assistance in explaining the prior-art method of manufacturing a radial tire.
Figure 2:
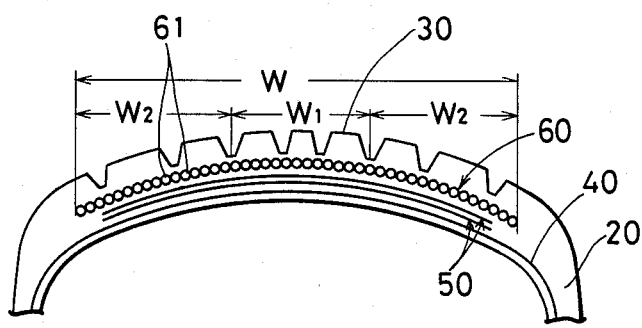
FIG. 2 is a diagrammatic cross-sectional view for showing the essential portions of a radial tire manufactured by the prior-art method, taken along a radial plane of the tire.
Figure 3A:
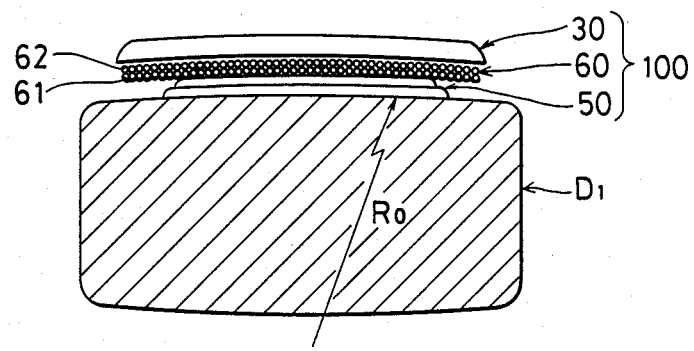
FIGS. 3 (A) to (B) are diagrammatic cross-sectional views for assistance in explaining the first embodiment of the method of manufacturing a radial tire according to the present invention.
Figure 3B:
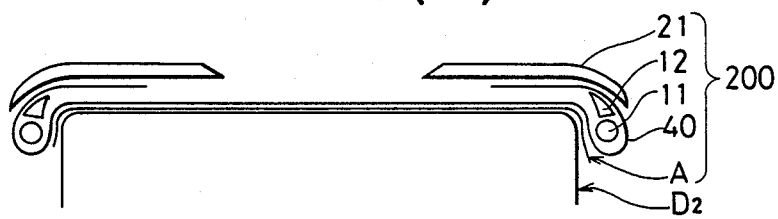
Figure 3C:
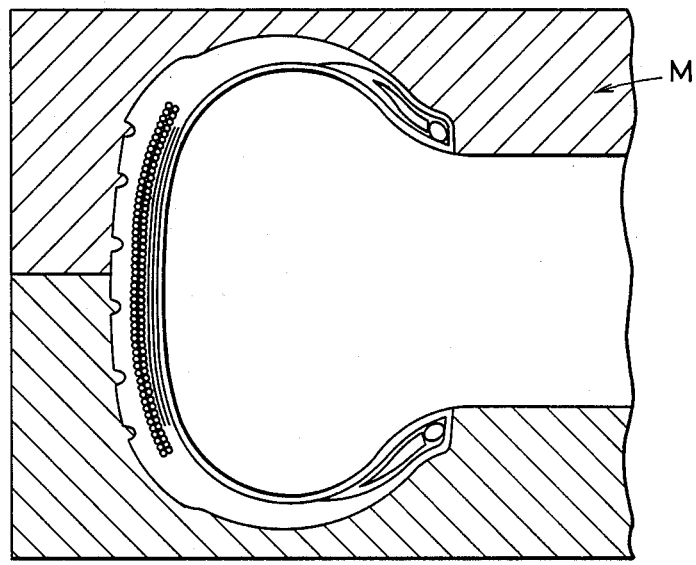

First, as shown in FIG. 3 (A), a belt 50 having two rubberized layers made of inextensible cords 51 represented by aromatic polyamide fiber or steel is formed on a drum $D_1$ having an outer periphery with a radius $R_0$ of curvature substantially the same as that $R_1$ of the tread 30 (see FIG. 6), in such a way that cords of each belt layer are arranged at an inclination angle of 10 to 30 degrees with respect to the drum circumferential direction and cords of different belt layers are laid one upon another so as to intersect each other.

Secondly, an auxiliary layer 60 having two layers 61 and 62 with a width slightly wider than that of the belt 50 is arranged over the belt 50 by winding a rubber-coated ribbon with a strip width 10 mm (2 to 15 nylon cords are arranged in parallel) around the belt 50. An examplary ribbon winding method is preferably such that the ribbon is wound beginning from a middle between the center and an end of the outermost belt layer toward one belt end in a first direction; when reaching the end, toward the other end in a second direction opposite to the first direction; and when reaching the other end, toward the initial winding position in the first direction in such a way that the ribbon is cut off at only two winding start and end positions.

Thirdly, a tread 30 is wrapped around the outermost periphery of the auxiliary layer 60 to form a band-shaped belt structure body 100, as depicted in FIG. 3 (A).

In another process different from that of the above method of manufacturing the belt structure body 100, a cylindrical carcass structure body 200 is formed around another flat drum $D_2$ by arranging an inner liner A, a carcass layer 40, two bead wires 11, two bead fillers 12, and sidewall rubbers 21, in accordance with the prior-art stacking order, as depicted in FIG. 3 (B).

Thereafter, the formed carcass body 200 is expanded into a toroidal shape, and the belt body 100 is fitted to the outer periphery of the toroidal carcass body 200 by matching the tread centers of both bodies 100 and 200, to form a green tire (not shown).

The formed green tire is set into a vulcanizing mold M as depicted in FIG. 3 (C) for vulcanization and hardening, to obtain a finished tire.

In the method of the present invention, since the belt 50 and the auxiliary layer 60 are both formed on the outer peripheral surface of the drum $D_1$ having a radius $R_0$ of curvature substantially the same as that $R_1$ of the tread 30, it is possible to realize a uniform initial tension or modulus over the entire width of the auxiliary layer 60 on a finished tire.

Therefore, in the tires manufactured by the method of the present invention, it is possible to effectively prevent by the auxiliary layer 60 the belt from being expanded radially outwardly at both end of the tire due to a centrifugal force generated when the tire is rotating at high speed. Since the belt is securely protected, it is possible to prevent the belt separation and improve the high-speed tire durability and uniformity.

With reference to FIG. 4, a second embodiment of the present invention will be described.

In the same way as in the prior-art method, a belt 50A having two layers is formed on a flat drum D and then an auxiliary layer 60A having two plies having a width a little wider than that of the belt 50A is formed on the belt 50A. In forming the auxiliary layer 60A, a rubber-coated ribbon formed by arranging heat-shrinkable cords is wound around the belt 50A begining from one end of the belt 50A in spiral fashion substantially in parallel to the circumferential direction of the drum D. In doing this in this embodiment, the entire width of the auxiliary layer 60A is divided into three equiwidths $W_1$ and $W_2$, and the ribbon is wound in the area $W_1$ under a tension of about 800 g per cord and in the areas $W_2$ under a tension of about 1040 g per cord.

In this method, since the tension of cords of the auxiliary layer 60A is set higher on both the ends of the belt 50A than at the center, when the green tire is set to a vulcanization mold, it is possible to increase the cord tension only at the central area $W_1$, thus resulting in a substantially uniform cord tension over the entire width of the belt 50A in the same way as in the first embodiment shown in FIGS. 3 (A) to (C).

In the above-description, the auxiliary layer 60 can be divided into four or more areas and further the ribbon cord tension can be decreased gradually from the end area $W_2$ to the central area $W_1$. Also, it is also possible to gradually increasing the ribbon cord tension from the central area $W_1$ to both the side areas $W_2$ when the ribbon is wound around the belt to form the auxiliary layer 60A.

The structure of the tire manufactured by the method of the present invention will be described hereinbelow with reference to FIGS. 5 and 6.

In the drawings, the reference symbol E denotes a radial tire manufactured by the method of the present invention shown in FIGS. 3 or 4, which comprises a pair of beads 10, a pair of sidewalls 20 extending to the beads, and a tread formed between two sidewalls 20. A carcass 40 is supported by the two beads 10 in such a way that carcass cords 41 extend substantially perpendicular to the tire equatorial plane. A plurality of belt layers 50 are arranged on the tread 30 of the carcass 40 in such a way that cords 51 of each belt layer are inclined at 10 to 30 degrees with respect to the tire equatorial plane and cords 51 of two different layers are laid one upon another so as to intersect each other. The auxiliary layer 60 of two plies is formed on the outermost layer of the belt 50 by winding heat-shrinkable cords 61 and 62 substantially in parallel to the tire equatorial plane.

The cords 61 and 62 of the auxiliary layer 60 are preferably organic fiber cord such as nylon, polyester, etc., which has an excellent adhesive property to the belt cord 51 or rubber and an appropriate heat shrinkability. The heat-resistant nylon cord is the most preferable.

Test Results

To verify the effect of the present invention, high-speed durability test and uniformity test have been effected as follows:

Test Tire Specifications (Tires of the present invention)

Tire size: 255/40V R17
Carcass: Two plies were formed by use of rayon cords 16540d/2 (the cord ends: 26.4 cords/25 mm) arranged perpendicular to the tire equatorial plane.
Belt: Two layers were formed so as to intersect each other by use of steel cord 1×5×0.23 inclined at 20 degrees with respect to the equatorial plane.
Aux. layer: Two plies were formed by use of nylon cord 1260d/2 (the number at ends: 26.4 cords/25 mm) arranged in parallel to the tire equatorial plane.
Method: Test tires were manufactured by the first method explained with FIG. 3. A radius R of curvature of the belt forming drum was 1200 mm.

(Tires for comparison)

Specifications of tire size, carcass, belt and auxiliary layer were the same as those of the tires of the invention. However, test tires were manufactured by the prior-art method (a flat drum).

High-Speed Durability Test

Test tires were mounted to 9-inch wide rims. The air pressure was 3.0 kg/cm², the load was 500 kg. The tires were rotated by increasing speed 10 by 10 km/hr after each one-hour travel on the drum, begining from an initial speed of 100 km/hr, until the tires were broken down. The drum was made of steel having a diameter of 1707 mm and a smooth outer surface.

Uniformity Test (radial force variation)

The rim width was 9 inch; the air pressure was 2.0 kg/cm²; and the load was 480 kg.

Table 1 below shows the test results, in which the durability and uniformity are indicated as indices in comparison with the prior-art tires (100). The greater the indics are, the better will be the durability and uniformity.

|  | Prior Art | Invention |
|---|---|---|
| High-speed durability | 100 | 110 |
| Uniformity | 100 | 120 |

The above table indicates that both durability and uniformity of the tire according to the present invention are fairly improved.

What is claimed is:

1. A method of manufacturing a radial tire comprising; a toroidal carcass, a belt arranged on a crown of the carcass, an auxiliary layer arranged on the belt, and having a width at least as wide as the width of said belt, and a tread rubber arranged on the auxiliary layer, which comprised the steps of:
   (a) forming the belt uncured by wrapping at least two rubber-coated layers made of inextensible cords around a drum having an axially convex outer surface, a radius of curvature of said axially convex outer surface being substantially the same as that of a cured tire tread in such a way that cords of each layer are inclined at an angle with respect to a drum circumferential direction and cords of two different belt layers are laid one upon another so as to intersect each other so that said belt is formed axially in parallel with said axially convex outer surface;
   (b) forming the uncured auxiliary layer on the belt by winding a ribbon composed of a plurality of heat-shrinkable rubber-coated cords around an outermost belt layer in spiral fashion along a tire circumferential direction;
   (c) bonding the tread rubber layer onto the formed auxiliary layer to form a belt structure body;
   (d) forming the carcass structure body independently from the belt structure body and expanding the formed carcass structure body into the toroidal shape;
   (e) fitting the formed belt structure body to an outer periphery of the formed toroidal carcass structure body to form a green tire; and
   (f) vulcanizing the formed green tire within a vulcanization mold to obtain a finished tire.

2. The method as set forth in claim 1, wherein the heat-shrinkable cords of the auxiliary layer are heat-resistant nylon.

3. The method as set forth in claim 1, wherein said inextensible cords of said belt comprise aromatic polyamide fibers.

4. The method as set forth in claim 1, wherein said inextensible cords of said belt comprise steel cords.

5. The method as set forth in claim 1, wherein the step of winding in spiral fashion comprises winding said ribbon from an initial winding location positioned between the center and an end of the outermost belt layer toward one belt end in a first direction until an end of said belt is reached and winding in a second direction toward the other end of said belt and then reversing the winding direction back to said first direction to the initial winding direction.

6. A method of manufacturing a radial tire comprising a toroidal carcass, a belt arranged on a crown of the carcass, an auxiliary layer arranged on the belt, and having a width at least as wide as the width of said belt, and a tread rubber arranged on the auxiliary layer, which comprises the steps of:

(a) forming the uncured belt by wrapping at least two rubber-coated layers made of inextensible cords around a flat drum in such a way that cords of each layer are inclined at an angle with respect to a tire circumferential direction and cords of two different belt layers are laid one upon another so as to intersect each other;

(b) forming the uncured auxiliary layer on the belt by winding a ribbon having a plurality of heat-shrinkable rubber-coated cords around an outermost belt layer in spiral fashion along a tire circumferential direction in such a way as to apply a higher tension at both side area ends of the belt layer than at a center area thereof;

(c) bonding the tread rubber onto the formed auxiliary layer to form a belt structure body;

(d) forming the carcass structure body independently from the belt structure body and expanding the formed carcass structure body into the toroidal shape;

(e) fitting the formed belt structure body to an outer periphery of the formed toroidal carcass structure body to form a green tire; and (f) vulcanizing the formed green tire within a vulcanization mode to obtain a finished tire.

7. The method as set forth in claim 6, wherein in step (b) of claim 2, width of auxiliary layer is divided into a plurality of regions and a cord tension is steppedly changed when the heat-shrinkable cord is wound around the outermost belt layer in such a way that a higher tension is applied to the cords in divided areas near both ends of the belt than in divided areas near the center of the belt.

8. The method as set forth in claim 6, wherein in step (b) of claim 2, the cord tension is gradually increased from the center of the belt to both ends thereof along a tire transversal direction.

9. The method as set forth in claim 6, wherein rubber-coated heat-shrinkable cords comprise heat-resistant nylon.

10. The method as set forth in claim 6, wherein a tension in said central area is about 800 g/cord and in both side area ends of said belt layer in the range of about 1040 g/cord.

* * * * *